United States Patent
Goto et al.

[11] Patent Number: 5,462,314
[45] Date of Patent: Oct. 31, 1995

[54] ELECTRO-FUSION FITTING HAVING A SOLID EMBEDDED HEATER WITH PERPENDICULAR PROJECTIONS

[75] Inventors: Yuichiro Goto; Hideki Kasa; Takatomo Harada, all of Osaka, Japan

[73] Assignee: Gas Research Institute, Chicago, Ill.

[21] Appl. No.: 213,238

[22] Filed: Mar. 15, 1994

Related U.S. Application Data

[63] Continuation filed as PCT/JP91/00412 March 29, 1991, abandoned.

[30] Foreign Application Priority Data

Mar. 30, 1990 [JP] Japan ................................ 2-86847

[51] Int. Cl.⁶ ................................................ F16L 47/02
[52] U.S. Cl. ............................................ 285/21; 285/284
[58] Field of Search ........................ 285/21, 284, 286; 219/535

[56] References Cited

U.S. PATENT DOCUMENTS

| | | |
|---|---|---|
| 2,739,829 | 3/1956 | Pedlow et al. . |
| 3,907,625 | 9/1975 | Vogelsanger ............. 285/21 |
| 4,792,374 | 12/1988 | Rianda . |
| 4,865,674 | 9/1989 | Durkin ........................ 285/21 |
| 5,107,095 | 4/1992 | Derbyshire . |
| 5,125,690 | 6/1992 | Taylor et al. ................ 285/21 |
| 5,254,824 | 10/1993 | Chamberlain et al. ...... 285/21 |

FOREIGN PATENT DOCUMENTS

| | | |
|---|---|---|
| 54-58777 | 5/1979 | Japan . |
| 109996 | 5/1986 | Japan . |
| 62-50122 | 3/1987 | Japan . |
| 272535 | 11/1988 | Japan . |
| 80/02124 | 10/1980 | WIPO . |
| 80/02405 | 9/1981 | WIPO . |

*Primary Examiner*—Eric K. Nicholson
*Attorney, Agent, or Firm*—Speckman, Pauley & Fejer

[57] ABSTRACT

An electro-fusion fitting includes a body which is provided with a heater including a magnetic alloy unit having a predetermined Curie temperature in the vicinity of a joint surface thereof in a manner that a surface of the heater is exposed on the joint surface. The joint surface of the body is brought into contact with a joint surface of a member to be coupled and, if a high-frequency current is applied to the magnetic alloy unit by electromagnetic induction, the magnetic alloy unit generates heat, and a temperature of the magnetic alloy unit is kept at the predetermined Curie temperature due to a temperature self-control function thereof. Therefore, if the Curie temperature is set at a fusion temperature, the joint surfaces of the body and the member to be coupled are coupled to each other.

5 Claims, 7 Drawing Sheets

ELECTRO-FUSION FITTING HAVING A SOLID EMBEDDED HEATER WITH PERPENDICULAR PROJECTIONS

This is a continuation of PCT/JP91/00412 March 29, 1991, now abandoned.

TECHNICAL FIELD

The present invention relates to an electro-fusion fitting. More specifically, the present invention relates to an electro-fusion fitting which is used for coupling synthetic resin pipes or the like.

PRIOR ART

One example of a conventional electro-fusion fitting used for coupling pipes made of synthetic resin material such as polyethylene, polybutene and etc. is disclosed in U.S. Pat. No. 4,117,311 (Sep. 26, 1978) or U.S. Pat. No. 4,486,650 (Dec. 4, 1984).

A conventional electro-fusion fitting 1 includes a body 2 of a hollow cylindrical shape made of synthetic resin as shown in FIG. 15. An electric heater wire 3 is buried in the body 2 and terminals 4 each being formed in a manner that the same is projected from the body 2 are connected to both end portions of the electric heater wire 3.

In such a conventional electro-fusion fitting 1, there was a problem that it is difficult to manufacture the same because it was necessary to form the terminals 4 at the both end portions of the electric heater wire 3.

In addition, there was another problem that since it is heated by the heat from the electric heater wire 3, it is difficult to control a temperature and thus nonuniformity of the temperature occurs easily.

SUMMARY OF THE INVENTION

Therefore, a principal object is to provide a novel electro-fusion fitting.

Another object of the present invention is to provide an electro-fusion fitting which can be manufactured easily.

Another object of the present invention is to provide an electro-fusion fitting in which no nonuniformity of temperature occur.

Another object of the present invention is to provide an electro-fusion fitting utilizing a magnetic alloy unit as a heater.

An electro-fusion fitting in accordance with the present invention is used for coupling a member to be coupled made of a first synthetic resin material, and comprises: a body made of second synthetic resin material and having a second joint surface which forms substantially the same curved surface as that of a first joint surface of the member to be coupled, said first synthetic resin material and second synthetic resin material having a first fusion temperature and a second fusion temperature, respectively; and a heater provided on the body in a manner that at least a portion of the heater is exposed on the second joint surface, and including a magnetic alloy unit, said magnetic alloy unit having a Curie temperature equal to or higher than the first fusion temperature and the second fusion temperatures.

The heater is buried, for example, in the vicinity of the second joint surface of the body, and the surface of the heater is exposed from the second joint surface. The Curie temperature of the magnetic alloy unit constituting the heater is set a most suitable temperature that is slightly higher than the fusion temperatures of the first and second synthetic resin materials.

Then, the both are fixed in a manner that the second joint surface of the body is conformed to the first joint surface of the member to be coupled. At that state, if high-frequency current is applied to the magnetic alloy unit constituting the heater by electromagnetic induction, the magnetic alloy unit generates heat by skin effect, and therefore, the temperature of the magnetic alloy unit and thus the heater increases. Thereafter, if the temperature of the heater reaches the Curie temperature, the permeability of the magnetic alloy unit drastically decreases, and therefore, almost no current flows therein and thus the temperature of the magnetic alloy unit, i.e. the heater does not increase any more. Then, if the temperature of the heater decreases due to heat conduction, the permeability of the magnetic alloy unit increases, and therefore, the current becomes to flow in the magnetic alloy unit again. Because such operations are repeated, the temperature of the magnetic alloy unit, i.e. the heater is kept at a substantially constant degree of the Curie temperature. Therefore, the first and second joint surfaces are heated with the Curie temperature of the magnetic alloy unit or near, that is, the most suitable temperature, the first and second joint surfaces of the body and the member to be coupled and surroundings thereof are fused, and therefore, the member to be coupled and the body are coupled to each other.

In accordance with the present invention, only a heater including a magnetic alloy unit may be provided on a body, and thus, it is not necessary to form power supply terminals as in the conventional one, the structure of the electro-fusion fitting becomes simple, and therefore, it is possible to easily manufacture an electro-fusion fitting. In addition, the temperature of the heater can be controlled at substantially constant degree by utilizing the Curie temperature of the magnetic alloy unit, it is possible to heat the first and second joint surfaces as wholes at the constant temperature without uniformity of temperature. If the magnetic alloy unit, i.e. the heater is provided on the body such that the surface thereof is exposed on the second joint surface, it is possible to directly heat by the heater not only the second joint surface of the body but also the first joint surface of the member to be coupled, and therefore, the both can be fused and bonded to each other with a short time. Furthermore, in a case where the heater is completely buried in the body such that the surface thereof can not be exposed, since the second synthetic resin material of the body is inserted between the heater and the first joint surface of the member to be coupled, joint strength at both ends of the body sandwiching the heater was not sufficient. On the other hand, if the heater is buried in the body such that the surface thereof is exposed on the second joint surface, the second synthetic resin material of the body is not inserted between the heater and the first joint surface of the member to be coupled, and therefore, the heater is directly sandwiched by the body and the member to be coupled, and therefore, it is possible to obtain sufficient larger joint strength. In preferred embodiments, the magnetic alloy unit constituting the heater is incorporated in the body in a form of a plate (plain plate, waved plate, or the like), punching metal, mesh, coil, ring, or thin film. However, such a magnetic alloy unit may be constructed as a synthetic resin layer in which magnetic alloy powder is mixed therein. In such a case, synthetic resin material of the synthetic resin layer may be the second synthetic resin material.

The objects and other objects, features, aspects and advantages of the present invention will become more

BRIEF DESCRIPTION OF THE DRAWINGS

FIG. 13A and FIG. 13B are illustrative views showing a further embodiment in accordance with the present invention, wherein FIG. 13A is a cross-sectional view and FIG. 13B is a bottom plan view;

BEST MODE FOR EMBODYING THE PRESENT INVENTION

Figure 1:
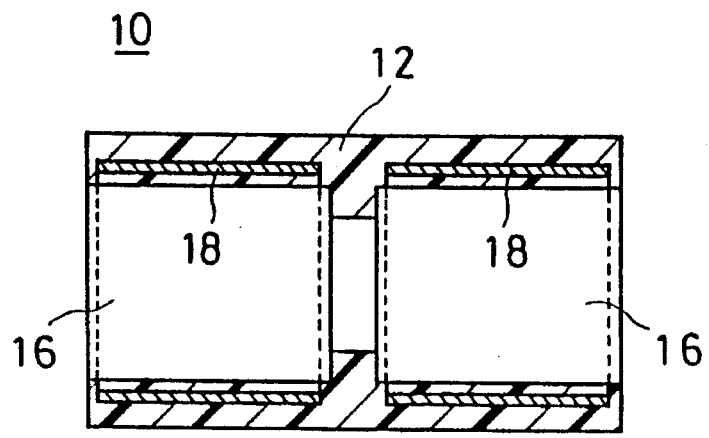
FIG. 1 is a cross-sectional view showing one embodiment in accordance with the present invention.

With reference to FIG. 1, an electro-fusion fitting 10 of this embodiment shown includes a body of a hollow cylindrical shape made of synthetic resin material such as polyethylene and etc. A hollow portion of the body 12 functions as socket 16 for receiving pipes 14 described later. A magnetic alloy unit 18 having approximately cylindrical shape is buried in the vicinity of each of inner surfaces, i.e. joint surfaces (second joint surfaces) of the sockets 16. The magnetic alloy units 18 function as heaters each having a predetermined Curie temperature. Since a magnetic alloy material disclosed in, for example, U.S. Pat. No. 4,256,945 (Mar. 17, 1981) can be used as such magnetic alloy units 18, it is incorporated by quotation in the specification, and therefore, detailed description thereof will be omitted here. Meanwhile, the Curie temperature of the magnetic alloy unit 18 can be adjusted by changing a mixing ratio of respective components of the alloy. Then, the Curie temperature is set a most suitable temperature for fusion-coupling. In addition, such a most suitable temperature may be, of course, different from each other dependent on kinds of first synthetic resin material utilized for the pipes 14 and second synthetic resin material utilized for the body 12.

Figure 2:
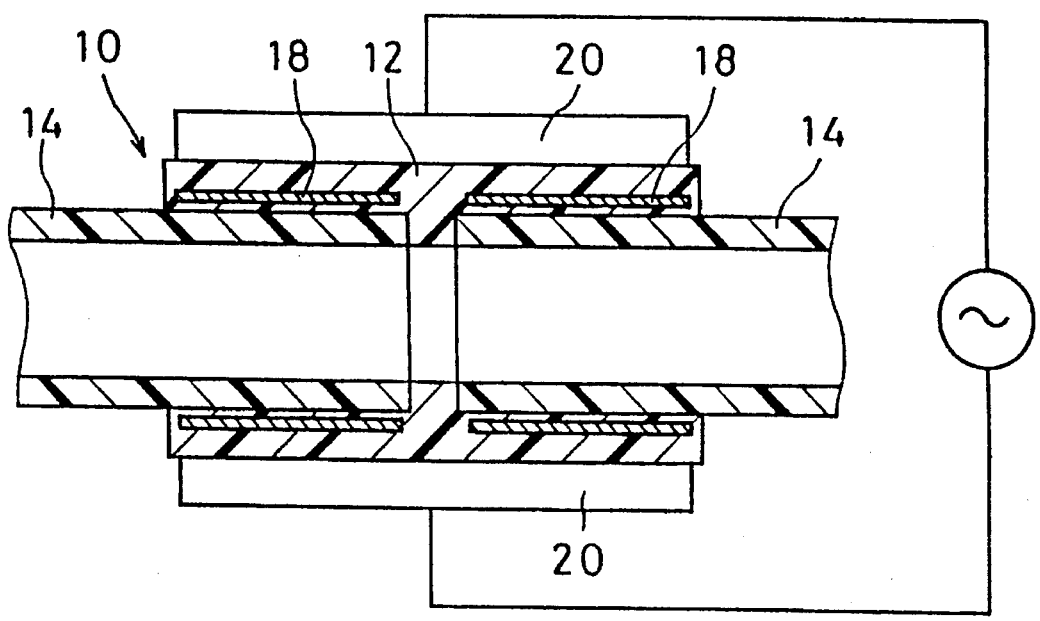
FIG. 2 is a cross-sectional view showing a coupled state of FIG. 1 embodiment.

With reference to FIG. 2, in fusion-coupling, the pipes 14 made of synthetic resin material such as polyethylene, polybutene or the like are inserted into the sockets 16 at left and right of the electro-fusion fitting 10, and then, high-frequency currents are applied to the magnetic alloy units 18 which are buried in the fitting 10 through electromagnetic induction by utilizing a high-frequency power source 20. Then, the current is concentrated in a skin portion of each unit due to a skin effect, and therefore, the unit rapidly generates heat. Then, if the temperature of the magnetic alloy unit 18 increases and reaches the Curie temperature thereof, the permeability thereof is rapidly decreased, and therefore, no skin current becomes to flow, and thus, the heat generated by the magnetic alloy unit 18 becomes very small. When the heat from the magnetic alloy units 18 is conducted to the body 12 and the pipes 14 and the temperature of the magnetic alloy unit 18 is decreased, each of the magnetic alloy unit 18 generates heat again due to the skin current. Therefore, the magnetic alloy unit 18, that is, the heater is kept at substantially constant temperature of the Curie temperature or near, that is, the above described most suitable temperature. Thus, synthetic resin material of the joint surfaces of the body 12 and the pipes 14 and the surroundings thereof are fused, and therefore, the both can be fusion-coupled.

In addition, as the above described high-frequency power source, a high-frequency power source as disclosed in U.S. Pat. No. 4,769,519 (Sep. 6, 1988) can be utilized. Therefore, by incorporating it by quotation detailed description thereof will be omitted here.

In accordance with this embodiment shown, since the high-frequency current is applied to the magnetic alloy units 18 by electromagnetic induction, it is not necessary to form terminals for supplying electric power thereto, and therefore, it is possible to easily manufacture the electro-fusion fitting 10. In addition, as the heater, being not limited by one of FIG. 1 embodiment, any one of heaters shown in FIG. 3–FIG. 11, for example may be used.

Figure 3:
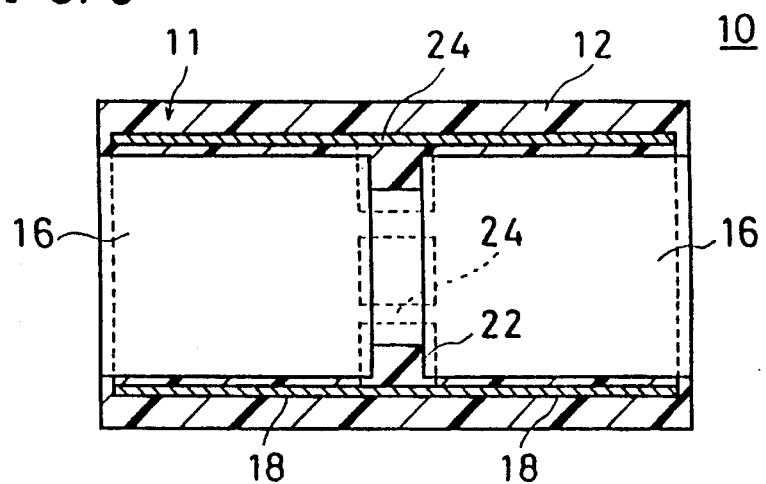
FIG. 3–FIG. 11 are cross-sectional views respectively showing modified examples different from each other.

In an embodiment shown in FIG. 3, a heater 11 in which the right and left magnetic alloy units 18 in FIG. 1 embodiment are connected to each other by a connection portion 14. In addition, the connection portion 24 is formed at portions of the body in a peripheral direction as shown by a dotted line in FIG. 3 so as to prevent a central portion 22 of the body 12 from being fused as much as possible. By connecting the two magnetic alloy units 18 to each other by such a connection portion 24, positions of the two magnetic alloy units 18 with respect to the body 12 in a diameter direction can be held in place, and therefore, the fusion-coupling can be implemented more surely.

Figure 4:
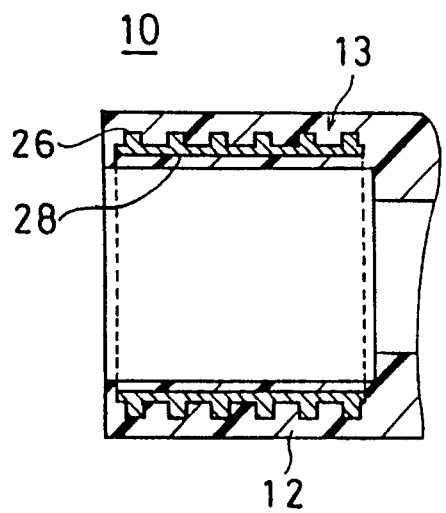

A heater 13 as shown in FIG. 4 includes a magnetic alloy unit 28 having a cylindrical shape (or a plate shape), and a plurality of longitudinal projections 26 extending in a peripheral direction are formed on an outer surface (or an inner surface) of the magnetic alloy unit 28. The longitudinal projections 26 has two functions, that is, a functions for preventing the magnetic alloy unit 28 and the body from being separated and a function for expanding of an heat radiating area.

Figure 5:
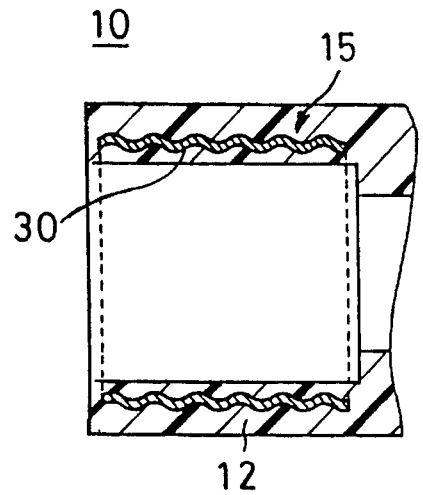

A heater 15 as shown in FIG. 5 includes a magnetic alloy unit 30 having a cylindrical shape (or plate shape) formed by a waved plate. A reason why the magnetic alloy unit 30 is constructed by the waved plate is the same as that of FIG. 4 embodiment.

Figure 6:
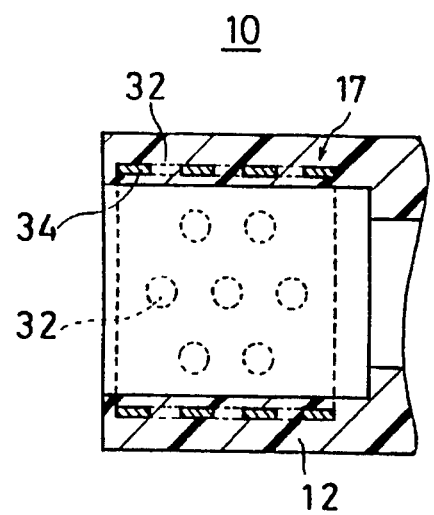

In an embodiment shown in FIG. 6, a heater 17 is constructed by a magnetic alloy unit 34 which is formed as a punching metal. That is, a plurality of throughholes 32 are formed on a peripheral surface of the magnetic alloy unit 34. The throughholes 32 are effective to prevent the heater 17, i.e. the magnetic alloy unit 34 and the body 12 from being separated from each other. That is, since the magnetic alloy unit 34 is held around by the synthetic resin material of the body 12 through the throughholes 32, and therefore, it is possible to prevent the both from being separated.

Figure 7:
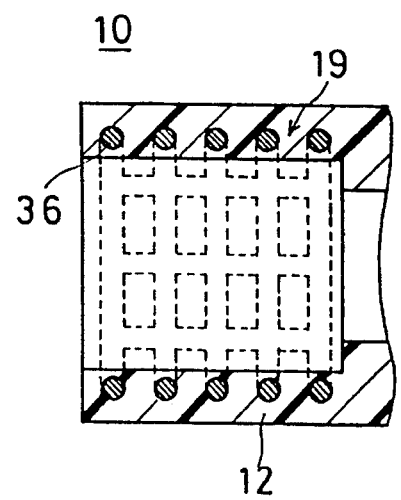

In a case where sufficient large opening factor can not obtained by the punched metal, a heater 19 constructed by a mesh-like magnetic alloy unit 36 as shown in FIG. 7 may be utilized. That is, if the mesh-like magnetic alloy unit 36 is utilized, a larger opening factor can be obtained, and therefore, insertion of the synthetic resin material of the body 12 is enhanced through the openings, and therefore, separation between the mesh-like magnetic alloy unit 36 and the body can be further prevented.

Figure 8:
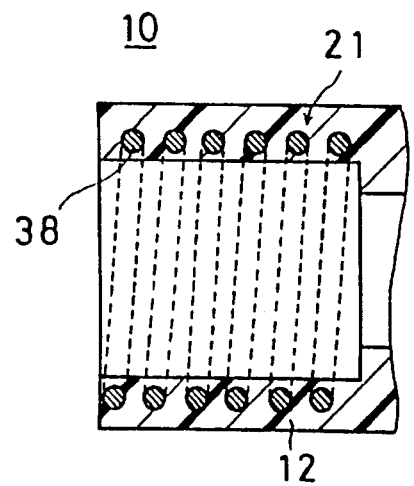

Even if a heater 21 composed of a coil-like magnetic alloy unit 38 as shown in FIG. 8 is utilized, it is possible to expect effects similar to that of FIG. 7 embodiment. In addition, in the embodiments shown in FIG. 6–FIG. 8, there is a further advantage that it is possible to save the amount of the magnetic alloy.

In the respective embodiments shown in FIG. 1–FIG. 8, the electro-fusion fitting 10 is obtained by injection molding the body in a manner that the magnetic alloy unit is held in the body. However, formation of the magnetic alloy unit may be modified as described in the following.

Figure 9:
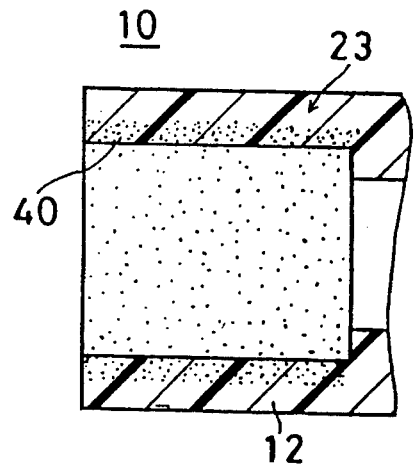

In an embodiment shown in FIG. 9, a heater 23, i.e. a magnetic alloy unit is formed as a magnetic alloy layer. More specifically, in this embodiment shown, a magnetic alloy layer is formed in the vicinity of the joint surface of the body 12, and the magnetic alloy layer includes a magnetic alloy powder 40 having a predetermined Curie temperature, and the same is mixed in the synthetic resin material of the body 12. By constructing the magnetic alloy unit by the magnetic alloy layer, not only the electro-fusion fitting can be further easily manufactured but also a problem of separation between the magnetic alloy unit (layer) and the body 12 can be freed.

Figure 10:
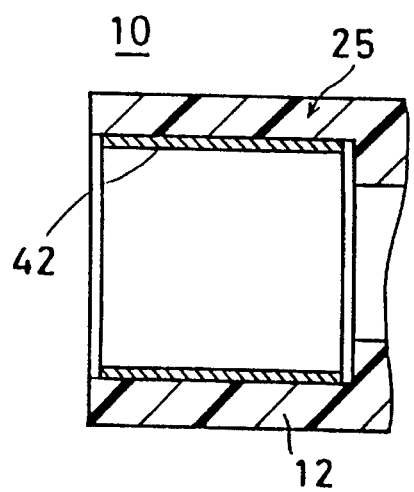

A heater 25 shown in FIG. 10 includes a magnetic alloy thin film 42 which is coated on the joint surface of the body 12. If the heater 25 is constructed by the magnetic alloy thin-film 42, the surface of the heater 25 is exposed on the joint surface of the body 12. In accordance with this embodiment in which the surface of the heater 25 is exposed on the second joint surface, it is possible to directly heat by the heater 25 not only the body 12 but also the member to be coupled, that is, pipes 14 (FIG. 1), and therefore, it is possible to fusion-couple the two joint surfaces with a short time. In addition, in accordance with this embodiment shown, since the magnetic alloy unit 42 is directly sandwiched by the body 12 and the pipe 14 (FIG. 1), it is possible to expect further increase of the joint strength.

Figure 11:
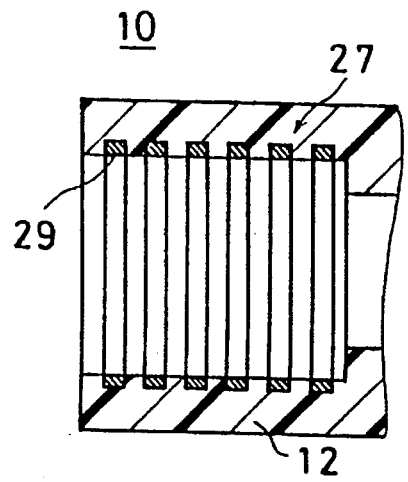

In addition, as shown in FIG. 11 embodiment, a magnetic alloy thin-film 29 which functions as a heater 27 may be coated in a surface of grooves which are formed on the joint surface of the body 12.

Furthermore, it will be easily understood that the idea that the heater, i.e. the magnetic alloy unit (layer) is exposed on the joint surface of the body 12 can be similarly applied to respective embodiments shown in FIG. 1, and FIG. 3–FIG. 9.

Figure 12:
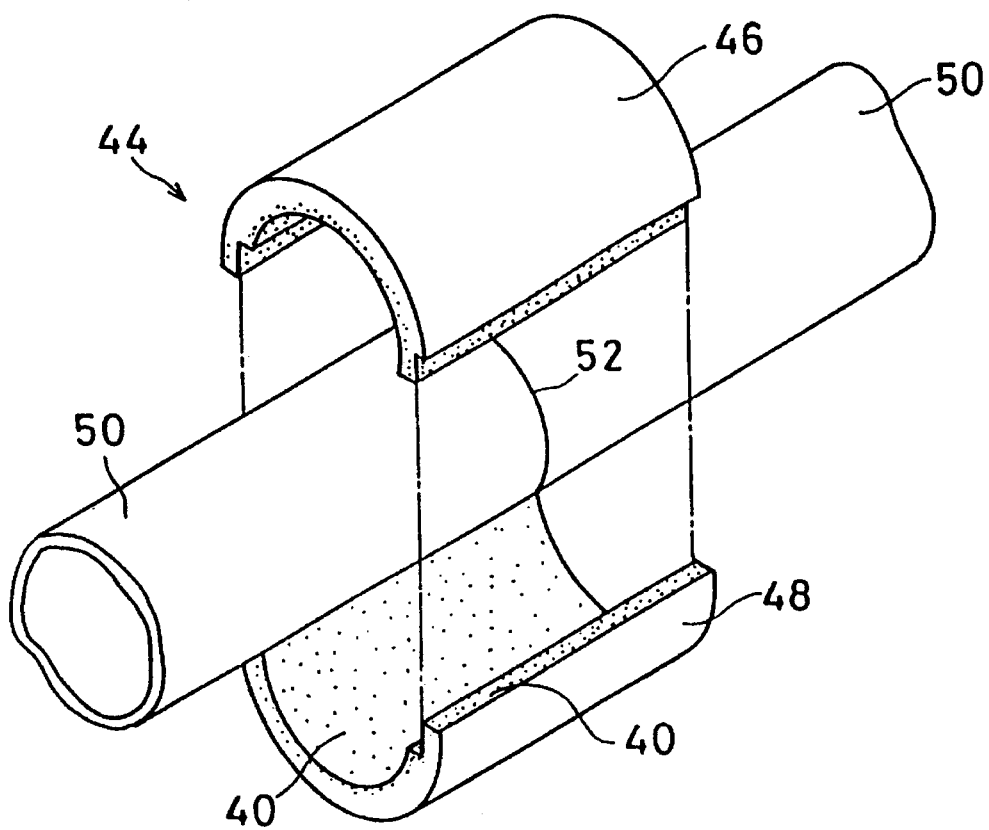
FIG. 12 is a perspective view showing another embodiment in accordance with the present invention.
Figure 13A:
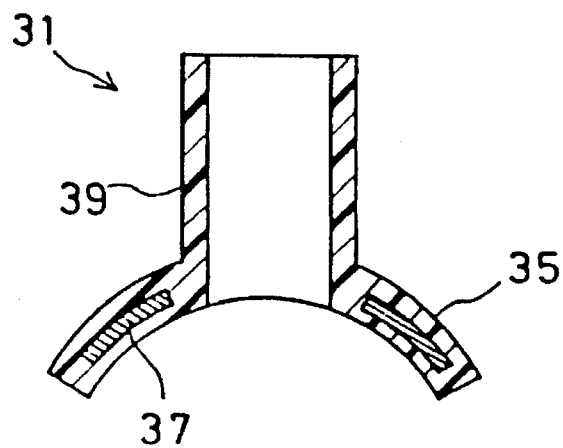
Figure 13B:
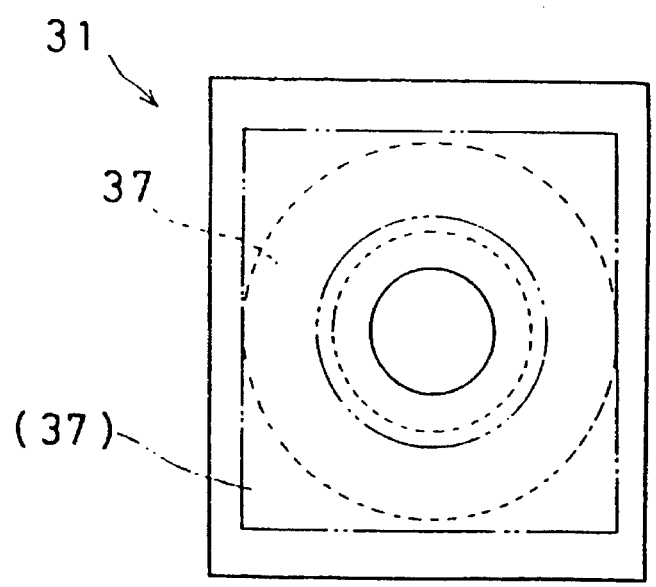
Figure 14:
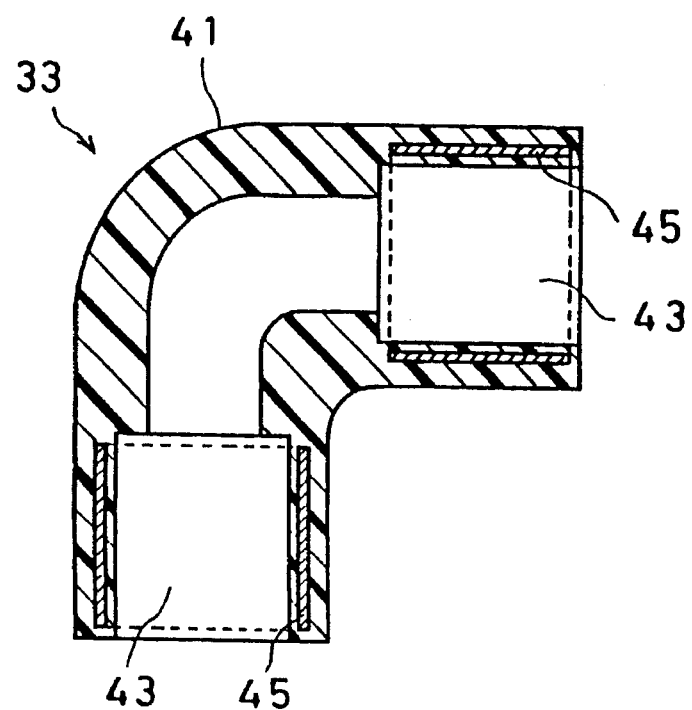
FIG. 14 is a cross-sectional view showing another embodiment in accordance with the present invention.
Figure 15:
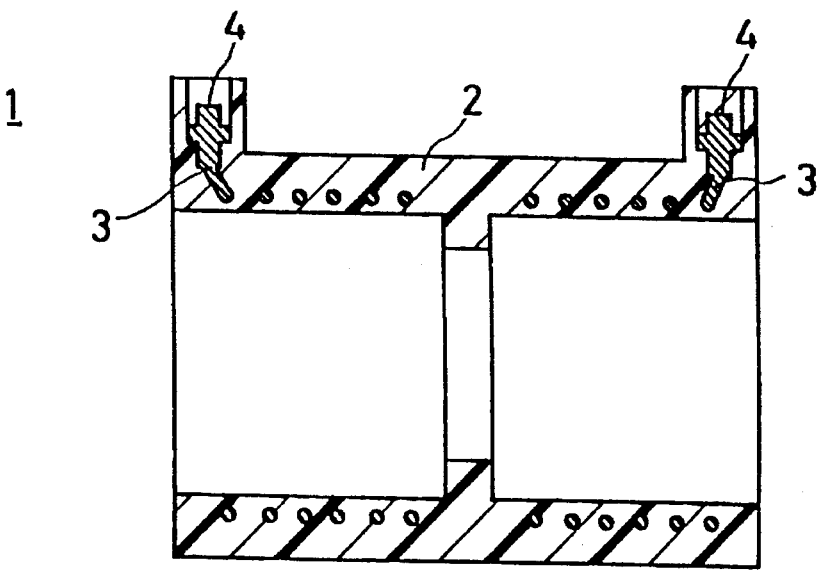
FIG. 15 is a cross-sectional view showing a prior art.

In addition, the present invention may be applied to a two-pieces divided type sleeve 44 as shown in FIG. 12, a saddle 31 as shown in FIG. 13A and FIG. 13B, an elbow 33 as shown in FIG. 14, and further tee, reducer or the like (not shown).

The two-pieces divided type sleeve 44 shown in FIG. 12 is composed of an upper piece 46 and a lower piece 48 each having magnetic alloy powder 40 which is mixed in the vicinity of the inner surface as similar to FIG. 9 embodiment. In coupling, end surfaces of two pipes to be coupled to each other are butt to each other, and the pipes 50 are sandwiched by the upper and lower pieces of the two-pieces divided type sleeve 44 in a manner that a butting portion 52 is positioned in a center thereof. Then, a high-frequency current is applied to the magnetic alloy powder 40 in a state where the upper and the lower pieces are fixed by a cramping tool (not shown). Thus, as similar to the previous embodiments, the magnetic alloy powder 40 generates heat, and therefore, the upper and lower pieces of the two-pieces divided sleeve 44 are fused and thus the pipes 50 are coupled to each other by the sleeve.

By utilizing a such a two-pieces divided type sleeve 44, works for inserting the pipes 50 in the sockets of the fitting can be saved, and therefore, it is possible to increase workability, and therefore, it is especially effective to joint of pipes each having a large diameter and heavy weight. In addition, in this embodiment shown, the heater of any types of the embodiments shown in FIG. 1, FIG. 3–FIG. 8 and FIG. 10–FIG. 11 can be utilized.

The saddle 31 shown in FIG. 13A and FIG. 13B includes a sitting portion 35 having a heater 37 in the vicinity of the inner surface, that is, joint surface of the sitting portion 35. The heater 37 may be formed in accordance with any one of previous embodiments at a position shown in FIG. 13A and FIG. 13B or a position shown by a two-dotted line in FIG. 13B. Then, at a central portion of the sitting portion 35, a branch pipe 39 is formed. In this embodiment shown, it is also possible to generate heat with the heater 37 by an induced high-frequency current.

The elbow 33 shown in FIG. 14 includes a body 41, and a heater 45 is formed in the vicinity of an inner surface of each of sockets 43 in accordance with any one of the previous embodiments. In this embodiment shown, it is also possible to generate heat with the heater 45 by an induced high-frequency current.

In addition, it is needless to say that the heater can be exposed on the joint surface of the body in FIG. 12 embodiment, FIGS. 13A and 13B embodiments or FIG. 14 embodiment.

Although the present invention has been described and illustrated in detail, it is clearly understood that the same is by way of illustration and example only and is not to be taken by way of limitation, the spirit and scope of the present invention being limited only by the terms of the appended claims.

We claim:

1. An electro-fusion fitting for coupling a member to be coupled, said member to be coupled made of a first synthetic resin material and having a curved first joint surface, said fitting comprising:

a body made of a second synthetic resin material and having a second joint surface forming a curved surface which substantially conforms to said first joint surface of said member to be coupled, said first and second synthetic resin material having first and second fusion temperatures, respectively; and a solid heater element completely embedded within said body, said solid heater element having a generally tubular shape, a plurality of projections extending generally perpendicularly from a surface of said solid heater element, said solid heater element including a magnetic alloy unit, and said magnetic alloy unit having a Curie temperature equal to or higher than said first and second fusion temperatures.

2. An electro-fusion fitting according to claim 1, wherein said projections extend radially outward from said surface.

3. An electro-fusion fitting according to claim 1, wherein said projections are cylindrical.

4. An electro-fusion fitting according to claim 1, wherein said projections are rectangular.

5. An electro-fusion fitting according to claim 1, wherein each of said projections is positioned an approximately equal distance from each adjacent projection.

* * * * *